US010204024B2

(12) United States Patent
Bos

(10) Patent No.: US 10,204,024 B2
(45) Date of Patent: Feb. 12, 2019

(54) SENT ERROR GENERATOR

(71) Applicant: Ford Global Technologies, LLC, Dearborn, MI (US)

(72) Inventor: Edward Albert Bos, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 97 days.

(21) Appl. No.: 14/741,560

(22) Filed: Jun. 17, 2015

(65) Prior Publication Data

US 2016/0371164 A1    Dec. 22, 2016

(51) Int. Cl.
| *G06F 11/00* | (2006.01) |
| *G06F 11/263* | (2006.01) |
| *H04L 12/26* | (2006.01) |
| *H04L 12/46* | (2006.01) |
| *G06F 11/22* | (2006.01) |
| *H04L 12/40* | (2006.01) |

(52) U.S. Cl.
CPC .......... *G06F 11/263* (2013.01); *G06F 11/221* (2013.01); *H04L 12/4625* (2013.01); *H04L 43/50* (2013.01); *H04L 2012/40273* (2013.01)

(58) Field of Classification Search
CPC .. G06F 11/2215; G06F 11/263; G06F 11/221; G06F 11/273; G06F 11/261; H04L 1/0007; H04L 1/0011; H04L 43/50; H04L 2012/40273; H04L 12/4625
See application file for complete search history.

(56) References Cited

U.S. PATENT DOCUMENTS

| 6,631,481 | B1* | 10/2003 | Hoard .................... G06F 11/24 702/124 |
| 7,391,186 | B2 | 6/2008 | Asada |
| 7,584,742 | B2 | 9/2009 | Bauerle |
| 8,250,911 | B2* | 8/2012 | Bauerle ................. G01M 15/02 73/114.36 |
| 8,645,020 | B2 | 2/2014 | Tomar |
| 2006/0238231 | A1* | 10/2006 | Mutaguchi ............... H03K 7/08 327/291 |
| 2014/0258566 | A1* | 9/2014 | Bowling ............. G06F 11/3089 710/18 |
| 2016/0124798 | A1* | 5/2016 | Shevelenok .......... G06F 13/385 714/57 |

OTHER PUBLICATIONS

Z. Yongqin, W. Xudong and Z. Meilan, "The Research and Realization for Passenger Car CAN Bus," 2006 International Forum on Strategic Technology, Ulsan, 2006, pp. 244-247.*

(Continued)

*Primary Examiner* — Jason B Bryan
(74) *Attorney, Agent, or Firm* — Frank A. MacKenzie; Bejin Bieneman PLC

(57) ABSTRACT

A test generator includes a computer programmed to receive at least one input instruction including a message to be transmitted by the test generator and an error command indicating errors to be introduced into the transmission. The computer is further programmed to generate a data frame formatted according to a single-edge-nibble-transmission protocol. The data frame includes the message and the errors. The computer is further programmed to transmit the data frame.

12 Claims, 4 Drawing Sheets

(56) References Cited

OTHER PUBLICATIONS

T. Rahul, S. Surendra and S. Shivaprasad, "Novel architecture for emulation of sensor protocols for complaince checking using Generic Timer Module," 2015 International Conference on Industrial Instrumentation and Control (ICIC), Pune, May 2015, pp. 1202-1207. (Year: 2015).*

* cited by examiner

SENT ERROR GENERATOR

BACKGROUND

Single-Edge-Nibble-Transmission (SENT) is a communication protocol for one-way communications between electronic modules, e.g., from a smart sensor to a computing device within an automobile. In order to test a SENT transmitter, e.g., during development, test equipment is required with a capability of receiving a signal from a SENT transmitter and recognizing various types of transmission errors. A SENT test receiver must first itself be tested to confirm that the test receiver recognizes the different types of errors.

DRAWINGS

DETAILED DESCRIPTION

Overview

Figure 1:
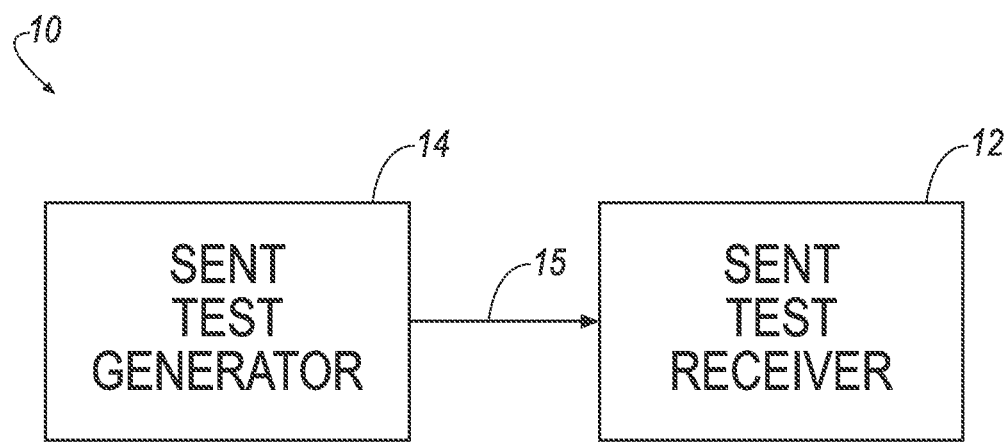
FIG. 1 is a block diagram of an exemplary SENT test transmitter in communications with a SENT test receiver.

A system 10 for testing a SENT (Single-Edge-Nibble-Transmission) test receiver 12 with a SENT test generator 14 is shown in FIG. 1. The SENT test generator 14 may generate SENT data frames 15 in real time that include specific types of one or more transmission errors. Types of transmissions errors that may occur, as non-limiting examples, include one or more low states too short, one or more low states too long, one or more high states too short, one or more high states too long, one or more data pulses too short, one or more data pulses too long, a pause pulse too short, a pause pulse too long, a calibration bit too short, a calibration bit too long, too few pulses in the data frame, and too many pulses in the data frame. One or more SENT data frames 15 including one or more transmission errors are transmitted to the SENT test receiver 12. The SENT test receiver 12 can then be monitored, for example via an interface, to determine if the SENT receiver 12 identified the transmission errors.

Exemplary System Elements

Referring to FIG. 1, a system to test a SENT test receiver 12 includes the SENT test receiver 12 and the SENT test generator 14.

The SENT test receiver 12 may comprise a computer that includes and/or is communicatively coupled to one or more interfaces as described further below, e.g., a hardware interface and/or a user interface such as a graphical user interface (GUI). The computer may be programmed to receive SENT data frames 15 and analyze the data frames 15 to determine if a transmission error occurred. The computer may further be programmed to identify a type of the transmission error, and to indicate, e.g., via a user interface, the type of error that was identified. The SENT test receiver 12 may further store data related to the SENT data frame 15 and associated error(s) such that the data is available for analysis. Still further, the SENT test receiver 12 may be communicatively coupled to one or more other computers, for example, via a wired or wireless network, and transmit data related to the received SENT data frame 15 and associated transmission errors.

Figure 2:
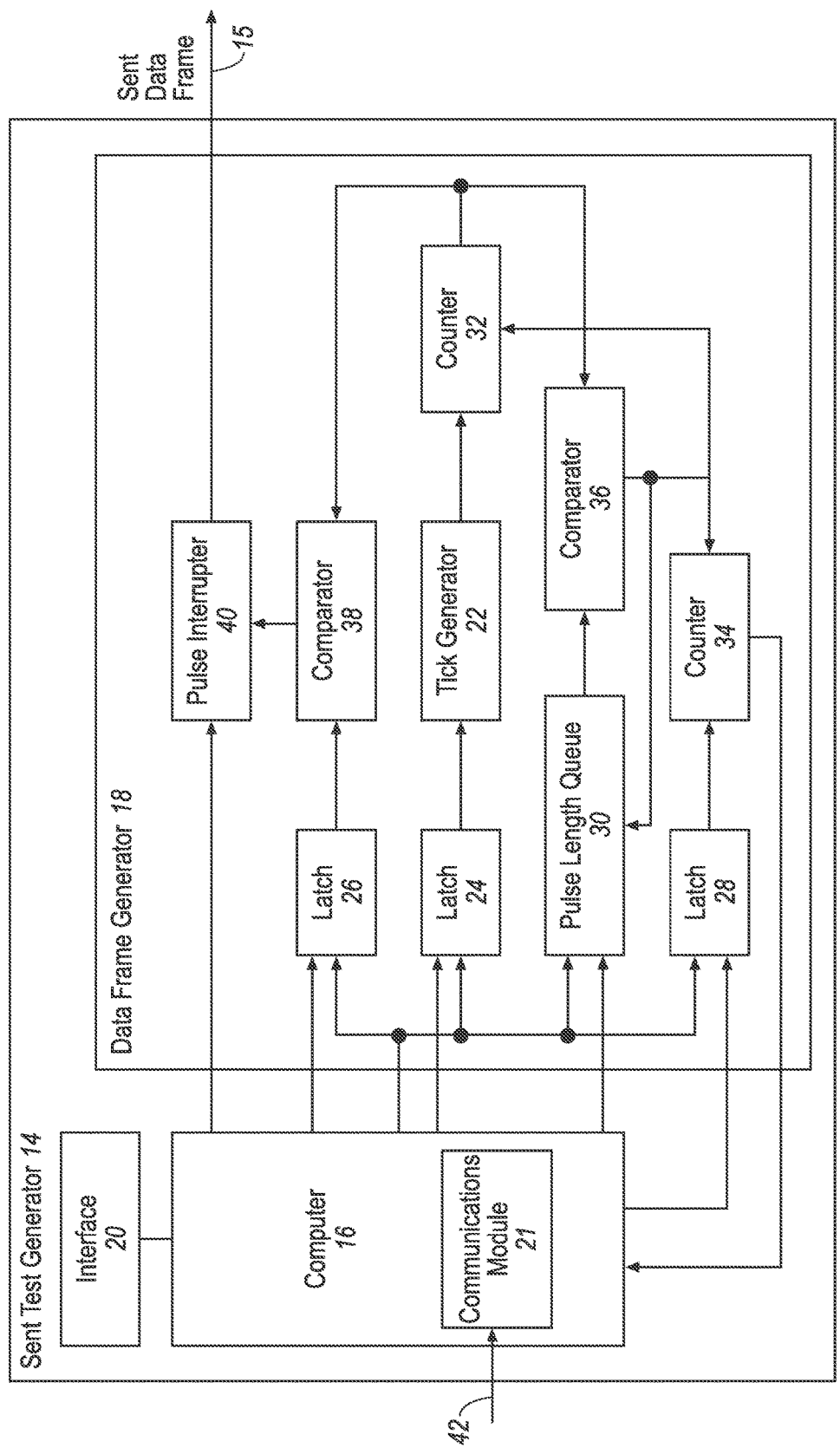
FIG. 2 is a block diagram of an exemplary SENT test transmitter.

An exemplary SENT test generator 14, shown in FIG. 2, includes a computer 16, a data frame generator 18, and an interface 20. The SENT test generator 14 includes one or more inputs and/or bus connections 42. The SENT test generator generates SENT data frames 15. The SENT test generator 14 is generally programmed to receive one or more instructions including a message to be transmitted according to a SENT protocol and, optionally, an error command including one or more errors that should be introduced into the transmitted data frame 15. That is, the SENT test generator 14 includes the capability to transmit data frames 15 including a message according to a SENT protocol. The data frames 15 may be alternatively generated with and without transmission errors. The message to be transmitted may be a value in a specified range, e.g., simulating a sensor output value, and may be received in a digital format. The errors may include one or more types of transmission errors, as discussed below.

The data frame generator 18 can generate a variety of data frames 15 that include one or more different transmission errors. For example, as described below, the computer 16 may, via the data frame generator 18, set a length of a pulse, a length of a low state of a pulse, and the number of pulses in the SENT data frame 15. Further, positive or negative noise pulses may be introduced in any location within the SENT data frame 15.

The computer 16 includes a processor and a memory. The memory includes one or more forms of computer-readable media, and stores instructions executable by the processor for performing various operations, including as disclosed herein. The computer 16 is generally programmed and arranged for communications on a controller area network (CAN) bus or the like, and may include a communications module 21 for providing communications via one or more networks. For example, the communications module 21 may be programmed to receive the test instructions via a CAN bus. The communications module 21 may further be programmed to store data received via the vehicle network, and, e.g., set one or more flags indicating that new data has been received.

The computer 16 may further be programmed to control the data frame generator 18 based on test instructions. As described below, the computer 16 may generate what is referred to herein as "intermediate data" based on a received message and error commands. The message and error commands may be received within a single network transmission, or may be received in separate network transmissions. The intermediate data may be, e.g., pulse length data, length of a low state, length of a pause pulse, a number of pulses in a data frame 15, etc. which the computer 16 may provide to the data frame generator 18 to specify a SENT data frame 15. The computer 16 may further generate control signals controlling the operation of the data frame generator 18 such that the data frame generator 18 generates and transmits the data frame 15. Additionally, the computer 16 may receive signals from the data frame generator 18, e.g., that the data frame generator 18 has completed the transmission of a data frame 15.

As described below, the SENT protocol supports multiple output sequences. The computer 16 may further be programmed to support the generation of one or more of these sequences. For example, the computer 16 may receive input from the interface 20 selecting a particular output sequence. Alternatively, the computer 16 may receive an instruction from the vehicle network selecting the particular output sequence. The computer 16 may then generate the intermediate data consistent with the selected output sequence.

The data frame generator 18 is an electronic circuit configured to perform operations associated with transmitting a SENT data frame 15 based on the intermediate data and control signals received from the computer 16. The data frame generator 18 includes a tick generator 22; first, second and third latches 24, 26, 28; a pulse length queue 30; first and second counters 32, 34; first and second comparators 36, 38; and a pulse interrupter 40.

The tick generator 22 is used to generate ticks which may be used as a time base for the data frame generator 18. The tick generator 22 generates periodic ticks. The tick period may be programmed, for example, by the computer 16. The tick generator 22 may, e.g., receive a 40 MHz clock as an input, and may generate, e.g., a periodic tick with a period of three microseconds.

The first latch 24 may be, for example, an eight bit latch used to program the period of the ticks generated by the tick generator 22.

The second latch 26 may be an eight bit latch, and may be used to program a length of low state of a SENT data pulse, as described below.

The third latch 28 may be an eight bit latch and may be used to store the number of pulses in the data frame 15. For example, if a pause pulse is required, the total number of pulses in the data frame 15 may include a total of ten pulses, and the value 0A (hex) may be stored in the latch 28. If, as another example, no pause pulse is required, the data frame 15 man include a total of nine pulses, and the value 09 (hex) may be stored in the latch 28.

The pulse length queue 30 may include, for example, eight 10-bit shift registers, arranged in parallel, forming effectively an eight bit wide shift register with 10 positions. The pulse length queue 30 may have an input and an output, each of the input and output being eight bits wide. Each position along the shift register may store a length of a particular pulse in a SENT data frame 15. The length of each pulse in the SENT data frame 15 may be input by the computer 16 at the input to the pulse length queue 30 and output by the pulse length queue 30 at the output. The pulse length queue 30 may further include, e.g., a shift input, and increment from one position to a next position upon receiving a shift signal at the shift input.

The first counter 32 may be an eight bit counter having a clock input and an eight bit output. The clock input may, e.g., be driven by the tick generator 22. The first counter 32 may be used, e.g., to control SENT pulse lengths, based on the length of respective pulses stored in pulse length queue 30.

The second counter 34 may be, for example, an eight bit counter, including a clock input and an eight bit output, and may be used to count the number of pulses that are transmitted in a SENT data frame 15. For example, at the beginning of each SENT transmission, the number of pulses in the SENT data frame 15 may be loaded into the second counter 34 from the third latch 28. The clock may be driven, for example, by a signal indicating an end of a currently transmitted pulse and a beginning of a next pulse. In this manner, at the end of each pulse, the second counter 34 is decremented. When the second counter 34 reaches zero, it may reload the number of pulses for a next SENT data frame 15, and issue an interrupt signal to the computer to load the pulse length queue 30 with the pulse lengths for the next SENT data frame 15.

The first comparator 36 may be an eight bit digital comparator, and may compare, for example, the eight bit output from the first counter 32 with the stored length of the pulse currently being output by the pulse length queue 30. When, for example, the value of the eight bit output from the first counter 32 is equal to the value output by the pulse length queue 30, the first comparator 36 may output a signal to reset the first counter 32, and decrement the second counter 34. The comparator 36 output signal may further be used to shift the pulse length queue 30. The currently transmitted pulse may end, and the next pulse may start.

The second comparator 38 may be an eight bit digital comparator, and may compare, e.g., the eight bit output from the first counter 32 with a value stored in the second latch 26. As discussed above, the value stored in the second latch 26 may be a length of a low state of a currently transmitted SENT pulse. The second comparator 38, may, for example, output a low state when the value of the eight bit output from the first counter 32 is less than the value stored in the second latch 26, and output a high state when the value of the eight bit output from the first counter 32 is greater than or equal to the value stored in the second latch 26.

The pulse interrupter 40 may be logic gates or transistors that when driven by an output from the computer 16, force a low state or a high state on the output. The pulse interrupter 40 circuit allows the computer 16 to override the output signal from the second comparator 38 and determine, independently of the output of the second comparator 38, the digital level of the SENT data frame 15 currently being transmitted.

The SENT test generator 14 may further include a user interface 20 that may be communicatively coupled to the computer 16. The interface 20 may include one or more output devices such as a display, lamps, speakers, etc. for communicating information to a user. The interface 20 may further include one or more input devices such as a touch screen display, a mouse, a keyboard, a gesture recognition device, switches, etc., for receiving input from the user.

Sent Protocol and Data Frame

The SENT protocol is described in Society of Automotive Engineers (SAE) Information Report Reference number J2716, entitled "SENT—Single Edge Nibble Transmission for Automotive Applications," as is generally known.

The SENT protocol is a one-way, asynchronous voltage interface for transmitting data, e.g., from a sensor to a computer, typically within a vehicle. According to the SENT protocol, data is transmitted in units of four bits (one nibble) for which the interval between two falling edges (single edge) of the modulated signal with a constant amplitude voltage is evaluated.

A sent data frame 15 includes a SENT message, and one or more control pulses. The SENT message may include eight data nibbles, each data nibble representing four bits of data. Each of the eight data nibbles may be used to transmit particular information. For example, a first data nibble may be a status and communications nibble providing information about the message. The second through seventh nibbles may be used, e.g., to transmit two measurement channels of three nibbles each (such as pressure and temperature). An eighth nibble may be used to transmit cycle redundancy check (CRC) or checksum information. Optionally, data can be transferred in five data nibbles. In this case, e.g., one of the two measurement channels may be omitted. Each data nibble is transmitted as a pulse, which is sometimes referred to as a data pulse herein. The data pulses representing each nibble are of variable length, depending on the four bit value of the data to be transmitted.

Figure 3:
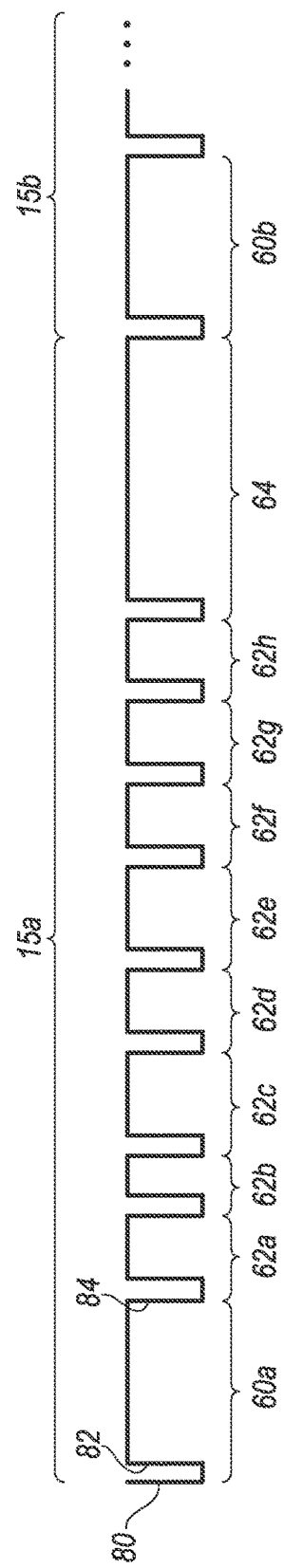
FIG. 3 is an exemplary SENT data frame.

The SENT message is transmitted within the SENT data frame 15, which includes a calibration pulse at the beginning of the data frame and may include a pause pulse at the end of the data frame. FIG. 3 illustrates a typical SENT data frame 15. The data frame 15 begins with a calibration pulse 60a. The calibration pulse may be followed, for example, by eight data pulses 62a-62h. Optionally, a pause pulse 64 may be included in the data frame 15 following the eighth data pulse 62h. Following the pause pulse 64, a new SENT frame 15b may be transmitted.

Still referring to FIG. 3, a first pulse in the SENT data frame 15a may be the calibration pulse 60a. The calibration pulse 60a may start at a first falling edge 80 and end at a second falling edge 84. The calibration pulse 60a may be 56 ticks long, where a tick is the clock used as a time reference for the data frame generator 18. Typically, the calibration pulse 60a is generated to be a known number of ticks in length, to serve as a time reference for the SENT receiver 12.

The calibration pulse 60a has a low state between falling edge 80 and rising edge 82, and a high state between the rising edge 82 and the falling edge 84. Typically, the low state may be 6 ticks long. The high state may be 50 ticks long such that the calibration pulse 60a length is a total of 56 ticks.

The data pulses 62a-62h each transmit four bits of data and may be, for example, from 12 to 27 ticks long. Typically, each of the data pulses 62a-62h may include low states having a same length. A typical length for the low state of the each of the data pulses 62a-62h is 6 ticks.

The data frame 15a may include, following the data pulses 62a-62h, a pause pulse 64. The pause pulse 68 may be of variable length, and adjusted such that a total length of each data frame 15 transmitted within, for example, the system 10, is a same total length.

The SENT protocol permits alternative output sequences in support of different applications. In each of the alternative output sequences, a first data nibble 62a may be used as a status nibble and an eighth data nibble 62h may be used as a cyclic redundancy check (CRC)/checksum nibble. The alternative nibble sequences may differ in a handling of second, third, fourth, fifth, sixth and seventh data nibbles 62b-62g. Examples of possible nibble sequences are listed below.

In a first exemplary output sequence, two channels of data are included in the data frame 15. The first channel includes 12 bits of data and is transmitted with second, third and fourth data nibbles 62b-62d. The second channel includes 12 bits of data and is transmitted with fifth, sixth and seventh data nibbles 62e-62g.

In a second exemplary output sequence, two channels of data are included in the data frame 15. The first channel includes 16 bits and is transmitted with second, third, fourth and fifth nibbles 62b-62e. The second channel includes eight bits of data and is transmitted with sixth and seventh data nibbles 62f-62g.

In a third exemplary output sequence, two channels of data are included in the data frame 15. The first channel includes 12 bits and is transmitted with second, third and fourth data nibbles 62b-62d. The second channel includes eight bits of data and is transmitted with fifth and sixth data nibbles 62e-62f. The seventh data nibble 62g may be an inverted copy of a most significant nibble of the first channel. The most significant nibble of the first channel may be, e.g., the second data nibble 62b.

In a fourth exemplary output sequence, two channels of data are included in the data frame 15. The first channel includes 12 bits and is transmitted with second, third and fourth data nibbles 62b-62d. The second channel includes eight bits of data and is transmitted with fifth and sixth data nibbles 62e-62f. The seventh nibble 62g may be set to value 00 (hex).

Typically, the first data nibble 62a includes status information, e.g., if a diagnostic issue has been detected with the first channel data, the second channel data, etc.

Typically, the eighth data nibble 62h includes cyclic redundancy check (CRC)/checksum data. The CRC/checksum data may be generated as a function of the data contained in the previous data nibbles 62a-62g, and may be used by a SENT receiver for determining that a valid SENT transmission has been received.

Other output sequences may also be generated which are consistent with the SENT protocol.

Error Conditions

Possible error conditions that may be introduced into a data frame 15 include a calibration pulse 60 too long, a calibration pulse 60 too short, one or more data pulses 62 too long, one or more data pulses 62 too short, a pause pulse 64 too short, a pause pulse 64 too long, a low state of a pulse too short, a low state of a pulse too long, too many pulses and too few pulses in the data frame. Additionally, error conditions may include positive and negative "noise" pulses which are forced into the SENT data frame 15. The noise pulses may be generated from a higher frequency time base than the ticks used as a time base to generate the data frame 15, and may simulate random noise being introduced into the data frame 15.

The errors related to incorrect shaping of a data pulse 62, e.g., pulse too long, pulse too short, pulse with low state too short, etc. may be introduced in any single data pulse 62, or any combination of data pulses 62.

As mentioned above, one of the data nibbles, typically the eight data nibble 62h, may include cyclic redundancy check (CRC) or checksum data. The data in the CRC/checksum data pulse is generated as a function of the previous data nibbles. An additional type of error that may be introduced is to alter either the CRC/checksum data or the data from which it was derived, such that the function is not fulfilled.

The error examples listed above are non-limiting. Other types of errors may be generated by the SENT test generator 14.

Generating a Sent Data Frame

As discussed above, the computer 16 may, together with the data frame generator 18, generate and transmit SENT data frames 15. The data frame generator 18 includes circuit blocks for performing operations such as generating a pulse with a certain length, generating a low state of a pulse with a certain length, sequencing the pulses in accordance with the SENT protocol, and introducing errors into the SENT data frame 15.

Programming the Data Frame Generator to Generate a Data Frame

Initially, the computer 16 may load intermediate data into data frame generator 18 to be used for generating a SENT data frame 15. For example, the computer 16 may load data into the first latch 24 that sets the period for the ticks to be generated by the tick generator 22. The computer 16 may further load the second latch 26 with a length (number of ticks) of a low state for each pulse, and load a length of each of the pulses of the SENT data frame in the pulse length queue 30. For the following discussions, digital values will be stated in hexadecimal (hex) format.

Sequencing through the SENT Data Frame

The second counter 34 may be used to count the pulses generated for the SENT data frame 15. For example, the second counter 34 may start at a count 0A. When the second counter 34 is at the count 0A, the pulse length queue 30 may output data from a first position. The first position of the pulse length queue 30 may contain a length of a first pulse of the SENT data frame 15. When the data frame generator 14 has completed generating and transmitting the first pulse, e.g., the calibration pulse 60a as described above, the second counter 34 may be decremented to the count 09. The pulse length queue 30 may be shifted to a second position containing a length for a second pulse of the SENT data frame, e.g., the first data pulse 62a. At the end of each pulse in the data frame 15, the second counter 34 may be decremented and the pulse length queue 30 may be shifted to a next position until the second counter 34 reaches the value 00 and the transmission is complete. The second counter 34 may then be set to a value corresponding to the number of pulses in the next data frame 15. The data frame generator 18 may start the generation of a new data frame 15.

Setting a Pulse Length for the Data Frame Pulses

A length of each pulse within the data frame 15 may be set with the tick generator 22, the pulse length queue 30, the first counter 32 and the first comparator 36. As described above, the pulse length queue 30 may be an eight bit wide shift register having 10 positions. Each position may store a length (number of ticks) for a pulse in the data frame 15.

The tick generator 22 generates a time base for the data frame generator 18. A length and frequency of ticks generated by the tick generator 22 may be programmed via the computer 16.

Based on the current pulse being generated, the pulse length queue 30 may be shifted to a corresponding position and output the length value stored in the position to a first input of the first comparator 36.

The first counter 32 may be reset at the beginning of the generation of each pulse and may be clocked by the tick generator 22. The first counter 32 may output a count value to a second input of the first comparator 36. The first comparator 36 may compare the output value of the first counter 32 with the value output from the pulse length queue 30. The first comparator 36 may detect when the first counter output value is equal to the value output from the pulse length queue 30. Based on the detection by the first comparator 36, the data frame generator 18 ends the current pulse being generated. Typically, the SENT data frame 15 returns to a low state. Additionally, the second counter 34 is decremented and the pulse length queue 30 is shifted. The data frame generator 18 proceeds to generate the next pulse in the SENT data frame 15.

Generating a length of each pulse individually allows the data frame generator 18 to introduce specific error conditions to pulses at specific locations within the data frame 15. For example, any single pulse or combinations of pulses may be generated to be too long or too short, by programming a desired pulse length into the pulse length queue 30.

Generating a Pulse Low State, Switching from a Low State to a High State

Typically, for example in the data frame 15a as described above, each pulse in a SENT data frame begins in a low state and transitions to a high state. The length of time that the pulse is low may be controlled by the first counter 32, together with the second latch 26 and the second comparator 38. As can be seen in FIG. 2, the second comparator 38 compares the output value from the first counter 32 with a value stored in the second latch 26. The second comparator 38 output can be set, for example, such that when the first counter 32 output value is less than a value stored in the second latch 26, the second comparator 38 output value, and therefore the value of the pulse being generated, is low. When the first counter 32 output value is, for example, greater than or equal to the value stored in the second latch 26, the second comparator 38 output value and the generated pulse value may be high. In this manner, the value stored in the second latch 26 may be used to control the length of time that the pulse is low.

Introducing Forced Pulses

The pulse value (high or low) as generated by the combination of the first counter 32, second comparator 38 and second latch 26 may be directly overridden by the computer 16 via the pulse interrupter 40. As described above, the pulse interrupter 40 may be configured as logic circuitry that blocks the output value of the second comparator 38 from being passed to the data frame output, and outputs directly a high or a low value, according to input received from the computer 16. Alternatively, the pulse interrupter 40 may include, e.g., low impedance transistors that "override" the output of the comparator 38. In this manner, e.g., the computer 16 can simulate an electrically noisy system by generating one or more positive pulses during a low period of a pulse, or one or more negative pulses during a high period of a pulse. The positive or negative pulses may be generated based on a time base with a higher frequency than the frequency of the ticks, and may therefore simulate noise in the data frame 15.

Alternate or Additional Ways to Receive Message and Error Data

Additionally or alternatively to receiving the SENT message and error commands via a vehicle network, other mechanisms may be used. For example, message data may be input as an analog signal, simulating a sensor analog output. The computer 16 may receive the analog signal, and convert, e.g., using an analog-to-digital converter (ADC) the analog input to a digital value. Further, for example, the interface 20 may include one or more switches or other input devices. The switches or other input devices may be set by a user to specify one or more types of errors to be generated by the SENT test generator 14.

Exemplary Process Flow

Figure 4:
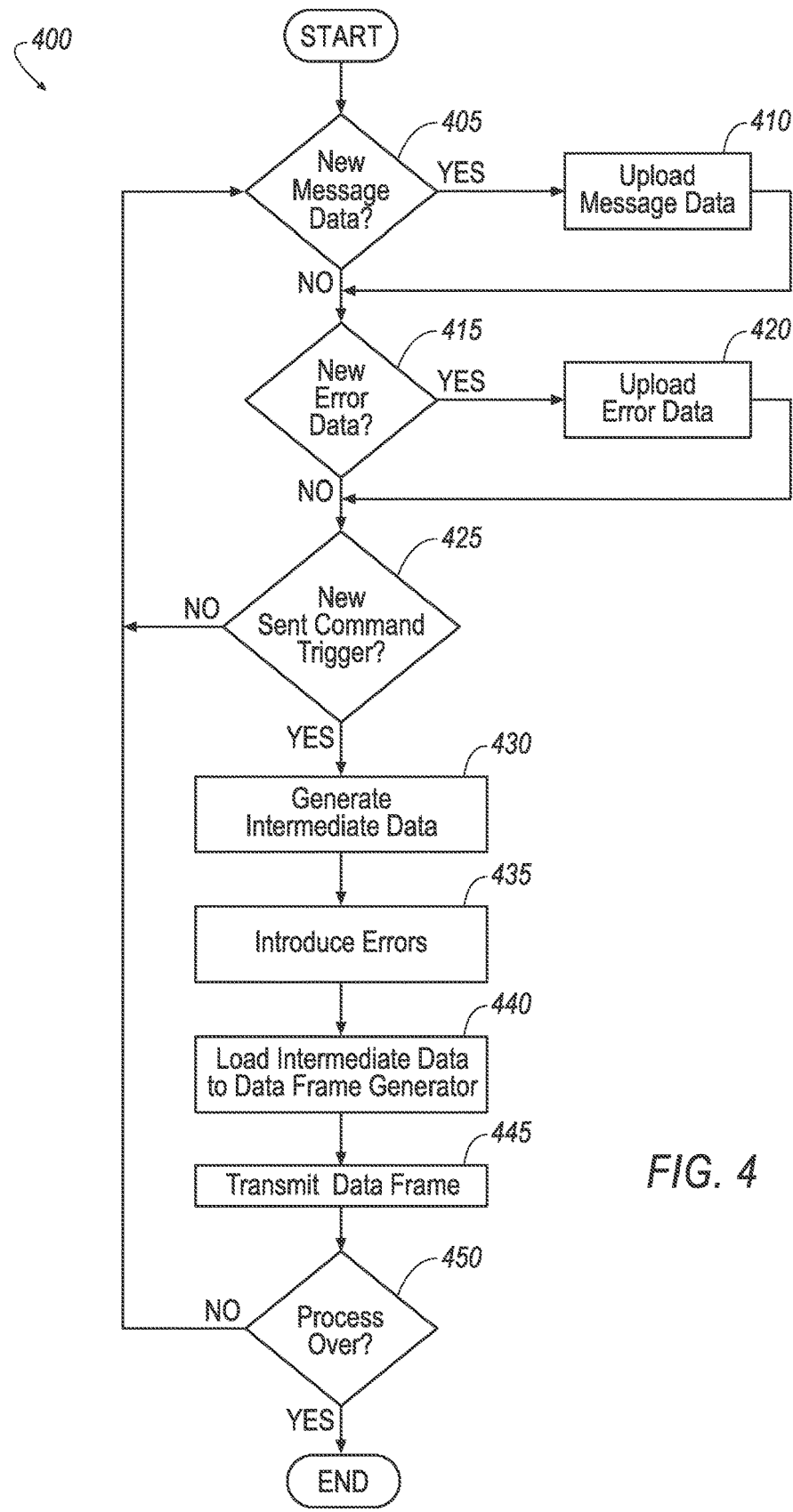
FIG. 4 is a flow diagram of an exemplary process for transmitting SENT data frames including transmission errors.

FIG. 4 is a diagram of an exemplary process 400 for generating a SENT data frame based on instructions received via a vehicle network bus. The process 400 starts in a block 405.

In the block 405, the computer 16 in the SENT test generator 14 determines whether new message data is available. For example, the communications module 21 computer 16 may receive an instruction including a message via the vehicle network bus 42. Upon receiving the instruction, the communications module 21 may store the message, and set a "message available flag" indicating that a new message is available. The computer 16, executing process 400, may query the module 21 for the message based on the flag. If the message available flag has been set, the process 400 continues in a block 410. If the message available flag has not been set, the process 400 continues in a block 415.

In the block 410, the computer 16 uploads the new available message to make its data available for processing. For example, the computer 16 may transfer the message data from the communications module 21 to a memory location allocated to processing of SENT data frames 15. The process 400 then continues in a block 415.

In the block 415, which may follow the block 405 or the block 410, the computer 16 determines whether new error data is available. For example, the communications module 21 may receive an instruction including error data via the vehicle network bus 42. Upon receiving the instruction, the communications module 21 may store the error data, and set an "error data available flag" indicating that new error data is available. The computer 16, executing the process 400, may query the flag. If the new error data available flag has been set, the process 400 continues in a block 420. If the message available flag has not been set, the process 400 continues in a block 425.

In the block 420, the computer 16 uploads the error data to make the data available for processing. For example, the computer 16 may transfer the error data from the communications module 21 to a memory location allocated to processing of SENT data frames 15. The process continues in a block 425.

In the block 425, the computer 16 determines if a trigger event has occurred for generating a new SENT data frame 15. For example, the computer 16 may receive a signal from the data frame generator 18 indicating that the data frame generator 18 is ready to receive new data. The signal may, e.g., be a ready flag set by the data frame generator 18, or an interrupt signal received from the data frame generator 18. If the computer 16 determines that a trigger event has occurred, the process 400 continues in a block 430. If the computer 16 determines that a trigger event has not yet occurred, the process 400 may return to block 405, and continue to monitor for the receipt of new message data.

If the computer 16 determines, in the block 425, that a trigger event has occurred, the process 400 continues in a block 430.

In the block 430, the computer 16 generates intermediate data, as described above, for generating a valid SENT data frame. The computer 16, based on the currently available message data received in blocks 405 and 410, determines a length of each pulse in the intermediate data, a period for the ticks, a length of a low state, a number of pulses, etc., consistent with the SENT protocol, and stores the data for further processing.

In the block 430, the computer 16 may, prior to generating the intermediate data, determine a particular output sequence to be transmitted. As described above, the SENT protocol supports multiple output sequences. The test generator 14 may support the generation of one or more of these sequences. For example, the computer 16 may receive input from the interface 20 selecting a particular output sequence. Alternatively, the computer 16 may receive an instruction from the vehicle network 42 selecting the particular output sequence. The computer 16 may then generate the intermediate data consistent with the message data received in blocks 405, and the selected output sequence. The process 400 continues in a block 435.

In the block 435, the computer 16 modifies the intermediate data generated in block 430 to introduce errors according to the error data received in blocks 415 and 420. For example, based on the error data, the computer 16 may modify the lengths of one or more pulses in the intermediate data, modify the period for the ticks, etc. The process continues in a block 440.

In the block 440, the computer 16 loads the intermediate data assembled in blocks 430 and 335, into the data frame generator 18. As described above, the length of each pulse of the SENT data frame is loaded into the pulse length queue 30, the period of the ticks is loaded into the first latch 24, the length of a low state is loaded into the second latch 26, etc. The process continues in a block 445.

In the block 445, the data frame generator 18, under control of the computer 16, generates a SENT data frame 15. The data frame generator 18 may further generate, e.g., an interrupt and/or ready flag, indicating that the data frame generator 18 is ready to start a new data frame 15 transmission. The process 400 continues in a block 450.

In the block 450, the computer 16 determines if the process 400 should end. For example, the computer 16 may be programmed to send one SENT data frame 15, and then wait for further instructions. Alternatively, the computer 16 may be programmed to continuously send SENT data frames 15, until it receives an instruction to discontinue the process 400. The instruction to discontinue the process 400 may come, e.g., from the interface 20 or via the network input 42. If the computer 16 determines that the process 400 should continue, the process 400 may return to block 405. Otherwise, the process 400 may end.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A test generator comprising:
   a data frame generator configured to generate a data frame according to a single-edge-nibble-transmission-protocol sequence based on intermediate data received from a computer, the data frame generator comprising:
   a tick generator configured to generate a periodic signal, wherein the computer is programmed to load a period of the periodic signal into the tick generator prior to generating the data frame;
   a pulse length queue including a plurality of memory locations, wherein the computer is programmed, prior to generating the data frame, to load a length of each of a plurality of pulses in the data frame in a respective one of the memory locations;
a first counter, having a clock input and an output; wherein the clock input is driven by the tick generator; and a length of a pulse is determined by comparing the output of the first counter with a respective stored length of the pulse stored in the pulse length queue;
a second counter for sequencing through the data frame, the second counter having a second output, wherein the computer is programmed to load a number of pulses in the data frame into the second counter prior to generating the data frame, and the second output indicates which pulse in the data frame is currently being generated by the data frame generator; and
the computer including a processor and a memory storing instructions executable by the processor; the computer programmed to:
receive at least one input including (1) a message selecting the single-edge-nibble-transmission-protocol sequence from a set of at least two predetermined single-edge-nibble-transmission-protocol sequences and including data to be transmitted by the selected single-edge-nibble-transmission-protocol sequence and (2) an error command specifying one or more errors, wherein the computer includes programming for generating each of the at least two predetermined single-edge-nibble-transmission-protocol sequences;
determine a single-edge-nibble-transmission-protocol-sequence to be transmitted based on the message selecting the single-edge-nibble-transmission-protocol sequence;
generate intermediate data according to the single-edge-nibble-transmission-protocol sequence to be transmitted, the intermediate data based on the data to be transmitted and the specified one or more errors;
transfer the intermediate data to the data frame generator; and
transmit, via the data frame generator, based on the intermediate data, the data frame, wherein the intermediate data includes a length of each pulse in the data frame, a length of the low state between pulses, the period for the periodic signal generated by the tick generator, and the number of pulses in the data frame.

2. The test generator of claim 1, wherein the set of at least two predetermined single-edge-nibble-transmission-protocol sequences includes:
a) a first single-edge-nibble-transmission-protocol sequence including three nibbles for a first channel of data and three nibbles for a second channel of data;
b) a second single-edge-nibble-transmission-protocol sequence including four nibbles for the first channel of data and two nibbles for the second channel of data;
c) a third single-edge-nibble-transmission-protocol sequence including three nibbles for the first channel of data, two nibbles for the second channel of data, and a nibble including an inversion of a most significant nibble of the three nibbles for the first channel of data; and
d) a fourth single-edge-nibble-transmission-protocol sequence including three nibbles for the first channel of data, two nibbles for the second channel of data, and a nibble set to a value 00 (hex).

3. The test generator of claim 1, wherein the computer is further programmed to:
receive the message selecting the single-edge-nibble-transmission-protocol sequence from one of a control area network (CAN) bus transmission and a user interface.

4. The test generator of claim 1, wherein the one or more errors includes at least one of:
one or more low states too short, one or more low states too long, one or more high states too short, one or more high states too long, one or more data pulses too short, one or more data pulses too long, a pause pulse too short, a pause pulse too long, a calibration pulse too short, a calibration pulse too long, too few pulses in the data frame and too many pulses in the data frame.

5. A method, for a test generator comprising:
a computer; and
a data frame generator configured to generate a data frame according to a single-edge-nibble-transmission-protocol sequence based on intermediate data received from the computer, the data frame generator comprising:
a tick generator configured to generate a periodic signal, wherein the computer is programmed to load a period of the periodic signal into the tick generator prior to generating the data frame;
a pulse length queue including a plurality of memory locations, wherein the computer is programmed, prior to generating the data frame, to load a length of each of a plurality of pulses in the data frame in a respective one of the memory locations;
a first counter, having a clock input and an output; wherein the clock input is driven by the tick generator; and a length of a pulse is determined by comparing the output of the first counter with a respective stored length of the pulse stored in the pulse length queue; and
a second counter for sequencing through the data frame, the second counter having a second output, wherein the computer is programmed to load a number of pulses in the data frame into the second counter prior to generating the data frame, and the second output indicates which pulse in the data frame is currently being generated by the data frame generator;
the method comprising:
receiving, by the computer, at least one input including (1) a message selecting a single-edge-nibble-transmission-protocol sequence from a set of at least two predetermined single-edge-nibble-transmission protocol sequences and including data to be transmitted by the selected single-edge-nibble transmission protocol sequence and (2) an error command specifying one or more errors, wherein the test generator includes programming for generating each of the at least two predetermined single-edge-nibble-transmission-protocol sequences;
determining a single-edge-nibble-transmission-protocol-sequence to be transmitted based on the message selecting the single-edge-nibble-transmission-protocol sequence;
generating intermediate data according to the single-edge-nibble-transmission-protocol sequence to be transmitted, the intermediate data based on the data to be transmitted and the specified one or more errors;
transferring the intermediate data to the data frame generator; and transmitting, via the data frame generator, based on the intermediate data, the data frame wherein the intermediate data includes a length of each pulse in the data frame, a length of the low state between pulses, the period for the periodic signal generated by the tick generator, and the number of pulses in the data frame.

6. The method of claim 5, wherein the set of at least two single-edge-nibble-transmission-protocol sequences includes:
  a) a first single-edge-nibble-transmission-protocol sequence including three nibbles for a first channel of data and three nibbles for a second channel of data;
  b) a single-edge-nibble-transmission-protocol second sequence including four nibbles for the first channel of data and two nibbles for the second channel of data;
  c) a third single-edge-nibble-transmission-protocol sequence including three nibbles for the first channel of data, two nibbles for the second channel of data, and a nibble including an inversion of a most significant nibble of the three nibbles for the first channel of data; and
  d) a fourth single-edge-nibble-transmission-protocol sequence including three nibbles for the first channel of data, two nibbles for the second channel of data, and a nibble set to a value 00 (hex).

7. The method of claim 5, wherein the one or more errors includes at least one of:
  one or more low states too short, one or more low states too long, one or more high states too short, one or more high states too long, one or more data pulses too short, one or more data pulses too long, a pause pulse too short, a pause pulse too long, a calibration pulse too short, a calibration pulse too long, too few pulses in the data frame and too many pulses in the data frame.

8. The test generator of claim 1, wherein the error command specifies two or more errors and the computer is further programmed to:
  generate the intermediate data based on the two or more specified errors.

9. The computer of claim 1, wherein each of the at least two predetermined single-edge-nibble-transmission protocol sequences includes a nibble including information about the data frame, at least first, second, third, fourth and fifth nibbles for transmitting the data and a CRC/checksum nibble for transmitting error detection data.

10. A test generator comprising:
  a data frame generator configured to generate a data frame according to a single-edge-nibble-transmission-protocol sequence based on intermediate data received from a computer, the data frame generator comprising:
    a tick generator configured to generate a periodic signal, wherein the computer is programmed to load a period of the periodic signal into the tick generator prior to generating the data frame;
    a pulse length queue including a plurality of memory locations, wherein the computer is programmed, prior to generating the data frame, to load a length of each of a plurality of pulses in the data frame in a respective one of the memory locations;
    a first counter, having a clock input and an output; wherein the clock input is driven by the tick generator; and a length of a pulse is determined by comparing the output of the first counter with a respective stored length of the pulse stored in the pulse length queue;
    a second counter for sequencing through the data frame, the second counter having a second output, wherein the computer is programmed to load a number of pulses in the data frame into the second counter prior to generating the data frame, and the second output indicates which pulse in the data frame is currently being generated by the data frame generator; and
  the computer, communicatively coupled to the data frame generator, including a processor and a memory storing instructions executable by the processor; the computer programmed to:
    receive at least one input including (1) a message selecting the single-edge-nibble-transmission-protocol sequence from a set of at least two predetermined single-edge-nibble-transmission-protocol sequences and including first and second channels of data and (2) an error command specifying one or more errors, wherein the computer includes programming for generating each of the at least two predetermined single-edge-nibble-transmission-protocol sequences;
    determine a single-edge-nibble-transmission-protocol-sequence to be transmitted based on the message selecting the single-edge-nibble-transmission-protocol sequence;
    generate intermediate data according to the single-edge-nibble-transmission-protocol sequence to be transmitted, the intermediate data based on the first and second channels of data and the specified one or more errors;
    generate intermediate data according to the single-edge-nibble-transmission-protocol sequence to be transmitted, the intermediate data based on (1) at least two nibbles representing data from the first channel, (2) at least two nibbles representing data from the second channel and (3) the specified one or more errors;
    transfer the intermediate data to the data frame generator; and
    transmit, via the data frame generator, based on the intermediate data, the data frame, wherein the intermediate data includes a length of each pulse in the data frame, a length of the low state between pulses, the period for the periodic signal generated by the tick generator, and the number of pulses in the data frame.

11. The test generator of claim 10, wherein the data frame includes first, second, third, fourth, fifth and sixth data nibbles for transmitting data from the first and second channels of data; and further wherein at least two of the first, second and third data nibbles include data from the first channel, and at least one of the fourth, fifth and sixth data nibbles for transmitting channel data includes data from the second channel.

12. The test generator of claim 10, wherein the specified one or more errors include a change of the data frame such that the data frame does not comply with the selected single-edge-nibble-transmission-protocol sequence.

* * * * *